United States Patent [19]

Smaby et al.

[11] 4,406,594
[45] Sep. 27, 1983

[54] COMPRESSOR OIL PUMP

[75] Inventors: Stephen A. Smaby, La Crescent, Minn.; Arthur L. Butterworth, La Crosse, Wis.

[73] Assignee: The Trane Company, La Crosse, Wis.

[21] Appl. No.: 269,304

[22] Filed: Jun. 1, 1981

[51] Int. Cl.³ .............. F04B 39/02; F03B 3/12; F01M 9/00
[52] U.S. Cl. ................... 417/368; 417/372; 417/902; 415/72; 184/6.18
[58] Field of Search ......... 417/368, 372, 902; 415/71, 72, 73, 168, 169 R; 184/6.18; 55/391, 394

[56] References Cited

U.S. PATENT DOCUMENTS

| 3,285,504 | 11/1966 | Smith | 230/207 |
| 3,410,478 | 11/1966 | Geisenhaver | 230/206 |
| 3,674,382 | 7/1972 | Kubota et al. | 417/372 |
| 3,692,435 | 9/1972 | Iida et al. | 417/372 |
| 4,091,638 | 5/1978 | Mitch | 417/902 X |
| 4,097,185 | 6/1978 | Wolf | 417/372 X |

OTHER PUBLICATIONS

"High Efficiency Reciprocating Compressors" by Delmar R. Riffe ASHRAE Journal, Sep. 1975, pp. 129-133.

Primary Examiner—Richard E. Gluck
Assistant Examiner—Peter M. Cuomo
Attorney, Agent, or Firm—Carl M. Lewis; Ronald M. Anderson

[57] ABSTRACT

A compressor oil pump with integral contaminant collector and helical vane for improved pumping efficiency. A generally cone-shaped pick-up tube is adapted to be attached to the lower end of a hollow rotatably driven vertical shaft for rotation thereby about its longitudinal axis. The lower end of the pick-up tube includes an inlet opening which extends into a reservoir of oil. An annular contaminant collection groove is disposed circumferentially within the wall of the pick-up tube forming a pocket. This groove collects and retains contaminant particles contained in oil which is swept up the tapered interior surface of the tube due to the centrifugal force developed by its rotation. The helical vane is provided in the interior of the pick-up tube to increase its pumping efficiency. The vane acts to accelerate the oil to the rotational speed of the pump, thereby improving the volumetric flow output from the pump.

9 Claims, 4 Drawing Figures

COMPRESSOR OIL PUMP

DESCRIPTION

1. Technical Field

The subject invention generally pertains to an oil pump, and specifically to a centrifugal oil pump adapted to be attached to the end of a hollow rotatably driven vertical shaft of a compressor.

2. Background Art

Hermetically sealed compressors are designed to operate for many hours without servicing and generally do not have any provision for periodically changing their lubricating oil to remove foreign material which may contaminate it. Such foreign matter may consist of metal particles, or sand remaining from the casting process by which parts of the compressor were manufactured. It is important that contaminant particles and grit be removed from the lubricating oil prior to its circulation through bearings and other friction wear points in a compressor to prevent their premature failure.

Typically, lubrication systems used in such compressors provide a filter or trap means within the lubricant passageways to prevent contaminants from circulating with the oil. Examples of such prior art are disclosed in U.S. Pat. No. 3,692,436 to Iida et al, and No. 3,674,382 to Kubota et al. In the Iida patent, an angled oil passage in the drive shaft includes either a machined shoulder or an insert for blocking the further progression of contaminants up the oil passage; particles so-trapped drain back into the oil reservoir where they may continue to constitute a potential hazard. The Kubota design provides a cavity enclosed by a split ring in one side of the central oil passage through the drive shaft where contaminants are thrown by centrifugal force, and thus prevented from draining back into the oil reservoir when the compressor is stopped. In both of these approaches, relatively expensive machining of the drive shaft is required to form the passages and contaminant trap.

The Iida and Kubota patents each disclose an oil pump having an outwardly angled passage in the rotating drive shaft to provide centrifugal force to pump oil up a central passage in the shaft for distribution to the bearings. An alternative design for a centrifugal oil pump is shown in U.S. Pat. No. 3,285,504 to Smith, wherein a hollow cone-shaped fitting is attached to the end of a drive shaft, extending down into a reservoir of oil. As the cone rotates, oil is forced upward through a hollow bore in the shaft due to the centrifugal force developed by rotation of the cone. Conventional centrifugal pumps such as these are capable of supplying a very limited volume of flow at very low pressure. Certain types of compressor designs may require a greater volume of lubricant flow than these conventional pumps can deliver; yet, it is desirable to avoid the higher cost of a more efficient positive displacement pump.

U.S. Pat. No. 3,410,478 to Geisenhaver suggests a method for increasing the pumping efficiency of a simple centrifugal pump, by providing a flat metal vane as a partition across the hollow bore of a long bullet-shaped pump and drive shaft. The patent teaches that the flat divider increases the output of the pump by reducing the slippage between the oil film and the wall of the pump/shaft, and breaks up refrigerant bubbles for improved separation within the shaft above the pump. However, even this improvement in pump output may be inadequate.

It is therefore an object of this invention to provide a low cost centrifugal oil pump with integral contaminant collector, which has a higher pumping efficiency than prior art designs.

It is a further object of this invention to separate contaminants from the lubricating oil in a manner which prevents their return to the oil reservoir.

It is a still further object of this invention to provide an oil pump which is adapted to be attached to the hollow vertical drive shaft of a compressor, to minimize machining operations of the shaft for purposes involving the lubrication system.

It is yet a further object of this invention to provide means for increasing the volumetric flow output of a simple centrifugal oil pump.

These and other objects of the present invention will become evident from the disclosure which follows and by reference to the attached drawings.

DISCLOSURE OF THE INVENTION

The subject invention is an oil pump, adapted to be attached to the lower end of a hollow rotatably driven vertical shaft, and extending therefrom into a reservoir of oil. Although especially suited for use in a compressor, the oil pump may be used in other types of machines. The pump comprises a pick-up tube having a generally inverted cone-shaped interior bore along a longitudinal axis which is in alignment with the axis of the shaft. An inlet opening at the lower end of the pick-up tube is immersed in the oil. This opening is substantially smaller in diameter than the hollow bore of the shaft, and the internal surface of the pick-up tube tapers radially outward between its two ends. Rotation of the pick-up tube thus causes oil entering the inlet to be pumped upward as it moves radially outward along the cone-shaped interior of the pick-up tube, due to the centrifugal force developed by its rotation.

In one aspect of the invention, an annular contaminant collection groove disposed circumferentially around the interior surface of the pick-up tube adjacent its larger end forms a pocket in the wall of the tube, which is in fluid communication with the interior thereof. Contaminant particles contained in the oil flowing up the interior of the tube are collected in the groove and retained in the pocket when the shaft stops rotating.

Another aspect of the invention is the provision of a vane having a helical twist about its longitudinal axis, disposed within the interior of the pick-up tube. The vane is oriented with its longitudinal axis substantially in coincidence with the axis of the pick-up tube, and accelerates the oil to the rotational speed of the tube to provide improved pumping efficiency.

DESCRIPTION OF THE PREFERRED EMBODIMENT

Figure 1:
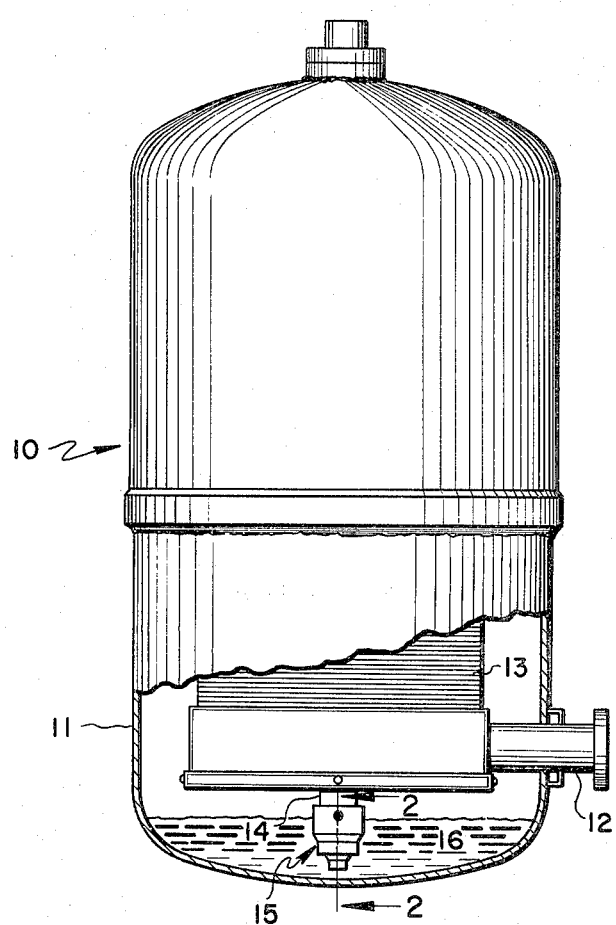
FIG. 1 is a cutaway view of a compressor showing the preferred embodiment of the subject invention installed on the lower end of a hollow rotatably driven vertical shaft.

With reference to FIG. 1, a scroll compressor is generally denoted by reference numeral 10. Compressor 10 is enclosed in a hermetically sealed shell 11, and is provided with a suction inlet manifold 12 through which refrigerant vapor may be admitted to the casing of compressor motor 13. A hollow drive shaft 14 extends vertically through the armature (not shown) of motor 13 and on its upper end is connected to drive an orbiting scroll (also not shown) for compressing the refrigerant vapor. The lower end of drive shaft 14 extends below motor 13 and is connected to a preferred embodiment of the subject invention, oil pump 15. The lower end of oil pump 15 is immersed in a reservoir of oil 16, in the sump of compressor 10. Further details of compressor 10 are not shown nor will they be further discussed herein, since they are unnecessary for a full disclosure of the preferred embodiment of oil pump 15.

Figure 2:
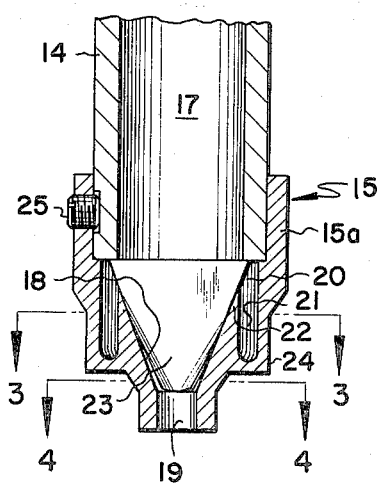
FIG. 2 is a cross-sectional view of the oil pump and a portion of the hollow shaft taken along section lines 2—2 of FIG. 1.
Figure 3:
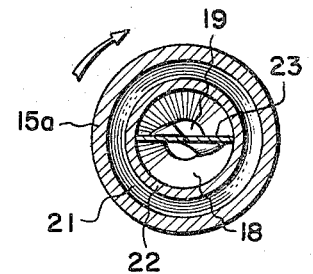
FIG. 3 is a cross-sectional view of the oil pump taken along section lines 3—3 of FIG. 2.
Figure 4:
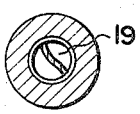
FIG. 4 is a cross-sectional view of the oil pump taken along section lines 4—4 of FIG. 2.

Turning now to FIGS. 2, 3, and 4, additional details of oil pump 15 are shown in three cross-sectional views. Oil pump 15 comprises a generally cone-shaped pick-up tube 15a, having an internal diameter at its larger upper end equal to the external diameter of drive shaft 15. Drive shaft 14 has a relatively large internal bore 17 which substantially reduces frictional losses associated with the flow of oil upward therethrough. The generally cone-shaped interior surface 18 of pick-up tube 15a extends from the internal bore 17 of shaft 15 downward to a relatively smaller inlet opening 19. An annular groove 20 is formed circumferentially around the interior surface 18 of pick-up tube 15a immediately adjacent the lower end of drive shaft 14. Annular groove 20 extends downward into the wall of pick-up tube 15a, forming a pocket 21, further defined by lip 22 which separates the interior surface 18 of pick-up tube 15a from the pocket 21.

A sheet metal vane 23 is provided diametrically across the interior of pick-up tube 15a and extends from the lower end of drive shaft 14 downward toward the inlet opening 19. Vane 23 is substantially trapezoidal in shape, and is helically twisted about its longitudinal axis through an arc of approximately 80 to 120 degrees per inch of length. Vane 23 is held in place within pick-up tube 15a by its compression against the lower end of drive shaft 14. As FIG. 3 shows, the helical twist of the lower end of vane 23 relative to its upper end is in the same direction as the rotation of shaft 14 when compressor 10 is energized, as indicated by the unnumbered arrow.

Oil pump 15 further includes an annular ridge 24 running circumferentially around the exterior surface thereof which is otherwise substantially cone-shaped. Rotation of oil pump 15 tends to cause cavitation which entrains bubbles of refrigerant in the oil which might block inlet opening 9. Ridge 24 is provided to reduce turbulence in the oil contained in the reservoir 16, to reduce the formation of bubble and foam, and to provide an increased capacity for the pockets 21.

The preferred embodiment of oil pump 15 is made from aluminum, and is turned on a lathe in the shape shown in FIG. 2. However, it is contemplated that in commercial production, pick-up tube 15a would be made from a metal casting or formed from plastic using an injection molding process. As shown in FIG. 2, oil pump 15 is attached to the lower end of drive shaft 14 by means of a set screw 25. Alternatively, oil pump 15 may be press fit on the lower end of drive shaft 14, or otherwise secured by a suitable adhesive such as epoxy.

Normally, the depth of oil in reservoir 15 should at least exceed the elevation of annular ridge 24. During operation of compressor 10, oil is drawn from reservoir 16 through the inlet 19 as the drive shaft 14 and the pick-up tube 15a rotate. Since vane 23 also rotates with pick-up tube 15a, the lower end of vane 23 tends to scoop up oil entering inlet 19, accelerating the oil simultaneously radially outward and upward toward the cone-shaped interior surface 19 of pick-up tube 15a.

Use of the helically twisted vane 23 provides a substantial improvement in the volumetric pumping efficiency of oil pump 15 when compared both to similar cone-shaped prior art oil pumps having no vane, or the oil pump of the Geisenhaver patent which is provided with a flat vane. For example, laboratory tests of pick-up tube 15a provided with the helically twisted vane of the subject invention produced a volumetric flow of 1300 cubic centimeters per minute, but only 700 cubic centimeters per minute when provided with a flat vane of the same dimensions (all other conditions being the same). The centrifugal force developed by the rotating helically twisted vane 23 and pick-up tube 15a causes the oil to flow vertically up the large diameter bore 17 of drive shaft 14. The greater volumetric flow produced by oil pump 15 is required in scroll compressor 10 to meet the lubrication requirements of the parallel plate thrust bearings used in this type compressor. This in no way implies that oil pump 15 is usable only on a scroll compressor such as compressor 10. It can be used on any type of compressor or other machine having a hollow bore rotatably driven vertical shaft.

Another significant operational aspect of oil pump 15 is the inclusion of an integral contaminant separator comprising annular groove 20 in the wall thereof. As oil flows vertically upward along the internal surface 18 of pick-up tube 15a, the relatively denser contaminant particles such as metal filings, sand, and other foreign matter contained in the oil are thrown by centrifugal force into groove 20 and retained there while the oil continues its upward flow through bore 17. When the compressor stops and drive shaft 14 and oil pump 15 cease rotating, these contaminant particles settle into the pocket 21 formed within the wall of pick-up tube 15a. Once these particles settle out within the pocket 21 they are retained therein and no longer constitute a potential hazard to the bearing surfaces of compressor 10. Laboratory experiments have shown that annular groove 20 is extremely efficient in trapping such contaminant particles and preventing their upward flow through the bore 17 of drive shaft 14. The relatively large volume of pocket 21 insure substantial capacity for trapping the total quantity of contaminant particles expected to be found in oil reservoir 16 during the operating life of the compressor.

Although vane 23 is shown as a separate insert manufactured from a strip of sheet metal, it will also be evident that vane 23 may be cast as an integral part of pick-up tube 15a. It will be understood that modifications such as those noted above will be apparent to those skilled in the art within the scope of the invention, as defined in the claims which follow.

We claim:

1. In a machine having a hollow rotatably driven vertical shaft, an oil pump adapted to being attached to the lower end of the shaft and rotated thereby while extending into a reservoir of oil, said oil pump comprising

- a pick-up tube having a small diameter inlet opening at one end which is immersed in oil and a relatively larger diameter opening at the other end which is adapted to connect to the hollow shaft, and having an internal surface which tapers radially outward between the two ends, said internal surface when rotated by the vertical shaft acting to centrifugally pump oil upward through the hollow bore of the shaft; and
- an annular contaminant collection groove disposed circumferentially around the interior surface of the pick-up tube adjacent its larger end, forming a pocket in the wall of said tube which is in fluid communication with the interior thereof, and thereby adapted to collect and retain any contaminant particles which may be contained in the oil flowing up the interior of the pick-up tube as it rotates, said particles being retained in the pocket when the shaft stops rotating.

2. An oil pump depending from the lower end of a hollow rotatably driven vertical shaft into a reservoir of oil in a compressor comprising

- a pick-up tube attached to the lower end of the shaft for rotation thereby, said pick-up tube having a generally inverted cone-shaped interior bore along a longitudinal axis which is in alignment with the longitudinal axis of the hollow shaft;
- an inlet opening at the lower end of the pick-up tube immersed in the oil of the reservoir, said inlet opening being substantially smaller in diameter than the hollow bore of the shaft, such that oil entering the inlet opening is pumped upward as it moves radially outward along the cone-shaped bore of the pick-up tube due to the centrifugal force developed by the rotation of the pick-up tube;
- an annular contaminant collection groove formed circumferentially within the wall of the pick-up tube adjacent the hollow bore of the drive shaft in a plane lying normal to the longitudinal axis of the pick-up tube, the side of said groove adjacent the interior of the pick-up tube defining a lip above which an annular slot is open to the interior of said tube, said collection groove acting to collect contaminant particles which may be contained in the oil flowing up the interior of the pick-up tube as it rotates, so that they are swept into the annular slot by centrifugal force and retained in the groove by the lip should the compressor shaft stop rotating.

3. The oil pump of the claims 1 or 2 further comprising a helically twisted vane disposed within the hollow interior of the pick-up tube, and rotating therewith, said vane having a longitudinal axis about which it is twisted, substantially in coincidence with the longitudinal axis of the pick-up tube.

4. The oil pump of claim 1 or 2 wherein the exterior of the pick-up tube is generally cone shaped.

5. The oil pump of claim 4 wherein the pick-up tube includes an annular ridge running circumferentially around the exterior of the tube along its cone-shaped surface, and immersed within the oil in the reservoir, said ridge being operative to reduce cavitation at the inlet of the pick-up tube.

6. The oil pump of claim 4 wherein the pick-up tube is adapted to be secured to the lower end of the driven hollow shaft with the end of the drive shaft pressing the helical vane in place within the interior of the pick-up tube.

7. In a machine having a hollow rotatably driven vertical shaft, an oil pump adapted to being attached to the lower end of the shaft and rotated thereby while extending into a reservoir of oil; said oil pump comprising

- a pick-up tube having a smaller diameter inlet opening at one end which is immersed in oil and a relatively larger diameter opening at the other end which is adapted to connect to the hollow shaft, and having an internal surface which tapers radially outward between the two ends, respectively, said internal surface, when rotated by the vertical shaft, acting to centrifugally pump oil upward through the hollow of the shaft;
- an annular contaminant collection groove disposed circumferentially around the interior surface of the pick-up tube adjacent the hollow bore of the drive shaft, forming a pocket in the wall of said tube which is in fluid communication with the interior thereof, said groove thereby adapted to collect and retain any contaminant particles which may be contained in the oil flowing up the interior of the pickup tube as it rotates, said particles being retained in the pockets when the shaft stops rotating; and
- a vane disposed within the interior of the pick-up tube along its longitudinal axis and twisted in a helical pattern about that axis, said vane being operative to provide improved pumping efficiency by the oil pump.

8. In a machine having a hollow rotatably driven vertical shaft, an oil pump adapted to being attached to the lower end of the shaft and rotated thereby while extending into a reservoir of oil, said oil pump comprising

- a pick-up tube adapted to be secured to the lower end of the hollow driven shaft, and having a generally cone-shaped exterior with a smaller diameter inlet opening at one end which is immersed in oil and a relatively larger diameter opening at said other end that is adapted to connect to the hollow shaft, and further having an internal surface which tapers radially outward between the two ends, respectively, said internal surface, when rotated by the vertical shaft, acting to centrifugally pump oil upward through the hollow of the shaft; and
- a vane disposed within the interior of the pick-up tube along its longitudinal axis, with the lower end of the drive shaft pressing the vane in place within the interior of the pick-up tube, said vane being twisted in a helical pattern about said axis and operative to provide improved pumping efficiency by the oil pump.

9. The oil pump of claims 7 or 8 wherein the vane is twisted through less than one full rotation about its longitudinal axis.

* * * * *